(12) United States Patent
Grotto et al.

(10) Patent No.: US 9,392,149 B2
(45) Date of Patent: Jul. 12, 2016

(54) CASE FOR SURVEILLANCE VIDEO CAMERA AND HOLDING DEVICE FOR A CASE FOR A SURVEILLANCE VIDEO CAMERA

(71) Applicant: VIDEOTEC S.P.A., Schio (VI) (IT)

(72) Inventors: Alessio Grotto, Schio (IT); Dario Zattara, Schio (IT)

(73) Assignee: VIDEOTEC S.P.A., Schio (VI) (IT)

( * ) Notice: Subject to any disclaimer, the term of this patent is extended or adjusted under 35 U.S.C. 154(b) by 0 days.

(21) Appl. No.: 14/430,830

(22) PCT Filed: Sep. 12, 2013

(86) PCT No.: PCT/IB2013/058504
§ 371 (c)(1),
(2) Date: Mar. 24, 2015

(87) PCT Pub. No.: WO2014/045170
PCT Pub. Date: Mar. 27, 2014

(65) Prior Publication Data
US 2015/0264228 A1    Sep. 17, 2015

(30) Foreign Application Priority Data
Sep. 24, 2012  (IT) .......................... MI2012A001589

(51) Int. Cl.
*H04N 5/225* (2006.01)
*G03B 17/55* (2006.01)
*G08B 13/196* (2006.01)

(52) U.S. Cl.
CPC .............. *H04N 5/2252* (2013.01); *G03B 17/55* (2013.01); *G08B 13/19619* (2013.01); *G08B 13/19632* (2013.01)

(58) Field of Classification Search
CPC ................. H04N 5/2252; G03B 17/55; G08B 13/19619; G08B 13/19632
See application file for complete search history.

(56) References Cited

U.S. PATENT DOCUMENTS

| 4,414,576 | A | * | 11/1983 | Randmae | H04N 5/2252 219/201 |
|---|---|---|---|---|---|
| 5,689,304 | A | * | 11/1997 | Jones | G08B 13/19619 348/143 |
| 7,857,527 | B2 | * | 12/2010 | Arbuckle | G08B 13/19619 396/428 |
| 2010/0067894 | A1 | * | 3/2010 | Arbuckle | G08B 13/19619 396/419 |
| 2013/0062228 | A1 | * | 3/2013 | Danilov | G02B 27/0006 206/216 |
| 2015/0116590 | A1 | * | 4/2015 | Huang | H04N 5/2252 348/373 |

* cited by examiner

*Primary Examiner* — Nicholas Giles
(74) *Attorney, Agent, or Firm* — Hedman & Costigan, P.C.; James V. Costigan; Kathleen A. Costigan

(57) ABSTRACT

The present invention relates to a case (1) for surveillance video cameras (2) comprising a first (3) and a second (4) half-shell connectable to each other to define a housing volume for at least one video camera (2). At least one of the first (3) and the second (4) half-shell comprises a transparent panel (5) intended to be placed in front of a lens of the video camera (2). The case further comprises a holding device (9) for the video camera (2) which defines a duct (8) conveying an air flow generated by air flow generating means (7) towards the transparent panel (5). Heating means (6) are provided for heating the generated air flow. At least one section of the conveying duct (8) has insulating walls. The invention relates also to a video camera holding device for use in protection cases.

10 Claims, 3 Drawing Sheets

CASE FOR SURVEILLANCE VIDEO CAMERA AND HOLDING DEVICE FOR A CASE FOR A SURVEILLANCE VIDEO CAMERA

TECHNICAL FIELD

The present invention relates to the field of cases for surveillance video cameras according to the preamble of claim 1.

PRIOR ART

The use of surveillance video cameras is an increasingly developing field; in this field it is known to house video cameras into enclosures or cases which accomplish several functions, such as protecting the video camera against atmospheric agents (especially in case of outdoor video cameras) and protecting the video camera against possible tampering actions.

To this end such cases are often made of metal and have a transparent panel placed in front of the lens of the video camera, such to allow it to properly monitor the areas of interest.

An example of such case is shown in the international patent application WO2010030558 to PELCO Inc. et al. , wherein the metal case houses a pivotable plate-like support upon which the video camera is secured, whose lens faces the front transparent panel.

In these installations several drawbacks have to be addressed as regards apparently opposing needs: on one side it is necessary to cool the electronic board intended to manage the power supply and/or to control the video camera and on the other side it is necessary to guarantee the transparent panel to be suitably heated in order to allow moisture to evaporate (above all present in cold temperature environments), which otherwise would condense on the transparent panel, misting it up, and making the surveillance difficult or even impossible.

It has to be considered that when mounting the case in cold environments it is also necessary to heat the whole body of the video camera, such to guarantee it to properly operate.

The case described in WO2010030558 is composed of two metal half-shells that can be closed, the video camera being arranged therein, on a pivoting plastic support.

Such case is provided with heating elements housed in its rear portion and with fans which are activated in order to cause warm air generated by the heating elements to flow towards the front transparent panel, such to keep it clear of moisture.

The plastic pivoting support of the video camera with the lower half-shell defines a channel for the passage of air directed from the rear of the case towards the transparent panel, such that the air actually passes under the body of the video camera.

This solution, even if functional as regards certain aspects, however has some drawbacks.

Firstly the heating elements are housed near the electronic board, therefore contributing to heat it in an undesired manner.

Secondly the warm air flow directed towards the panel reaches it only after a part of heat has dissipated, due to the natural heat exchange with the metal wall (a good heat conductor) of the lower half-shell of the case, which defines one of the walls of the air flowing channel.

Therefore the transparent panel is not optimally heated, especially when the temperature outside the case is very low (for example think of when the case is mounted outside during the winter season), resulting in the risk of misting the transparent panel up and of a relevant reduction in the functionality of the whole surveillance system.

Then, in the event the case is equipped for receiving power from the same Ethernet cable that carries the video and control data for the video camera, for example by PoE (Power Over Ethernet, standard IEEE 802.3af-2003) or POEplus (standard IEEE 802.3at-2009) technology, the electric power that is available for powering all the apparatuses (video camera, fans, heating elements) is limited and therefore it is inconceivable to increase the heating of the panel by acting too much on the power.

Finally, a further drawback is related to the fact that the assembly of the video camera and its fitting into the case is quite difficult, it being necessary to arrange the case and to fit therein the pivoting support, the heating elements, a video camera control/command electronic board, one or more fans and the video camera itself.

OBJECTS AND SUMMARY OF THE INVENTION

The object of the present invention is to overcome the drawbacks of the prior art.

Particularly the object of the present invention is to provide a case for surveillance video cameras wherein the transparent panel can be optimally heated without the need of necessarily increasing the power of the heating elements and the relevant consumption.

Briefly, the idea at the base of the present invention is to provide a case for surveillance video cameras housing a holding device for the video camera defining the surrounding walls made of plastic material of at least one section of a duct conveying an air flow directed towards a transparent panel, a part of the case, and placed in front of the video camera.

Thus the air is conveyed on the heating means, for example heating elements, and it remains well isolated, such that even a low external temperature does not cause the temperature of the air flow to decrease, with advantages for the overall performance of the system.

Moreover according to a further advantageous feature taken alone or in combination with the previous feature, the heating means besides heating by convection the air flow directed to the transparent panel, they heat by conduction also a metal plate placed directly in contact with the body of the video camera, such to keep it warm when necessary.

Thus it is possible to use at best the heat generated by the heating means, avoiding losses and accomplishing the objects defined above.

Another object of the invention is also a holding device for the functional components of a video camera (e.g. electronic board, fans, heating elements, etc.) intended to be easily mounted in a case, thus allowing old video surveillance systems to be easily upgraded.

In one embodiment, the holding device comprises a body comprising linking means for supporting a video camera in different relative positions with respect to the body, air flow generating means (7), and at least one electric circuit for powering and/or controlling the air flow generating means. The body of the device comprises a housing for the air flow generating means and a housing for the electric circuit. The body comprises a first and second part connectable to each other, and such that, once coupled, define at least one section of a conveying duct for an air flow. The duct is defined by surrounding walls made of insulating material, preferably plastic material, and extending between a first and a second end. The first end opens on the housing for the air flow generating means, while the second end faces an end of the body opposite to the position of the housing on the body itself.

Thus there is provided a video camera holding device which is efficacious in demisting a case and at the same time it is such to allow a simple and rapid assembly within a case for video cameras, since it is sufficient to insert the holding device into the case and secure it thereto, for example by screws or even better by means of snap couplings, such to have immediately available all the housings necessary for the video camera, for the functional components and the ducts for diffusing the warm air towards the transparent panel.

Further characteristics and objects of the present invention will be more clear from the following description.

BRIEF DESCRIPTION OF THE DRAWINGS

The invention will be described below with reference to non-limiting examples, provided by way of example and not as a limitation in the annexed drawings.

These drawings show different aspects and embodiments of the present invention and, where appropriate, reference numerals showing like structures, components, materials and/or elements in different figures are denoted by like reference numerals.

DETAILED DESCRIPTION OF THE INVENTION

Figure 1:
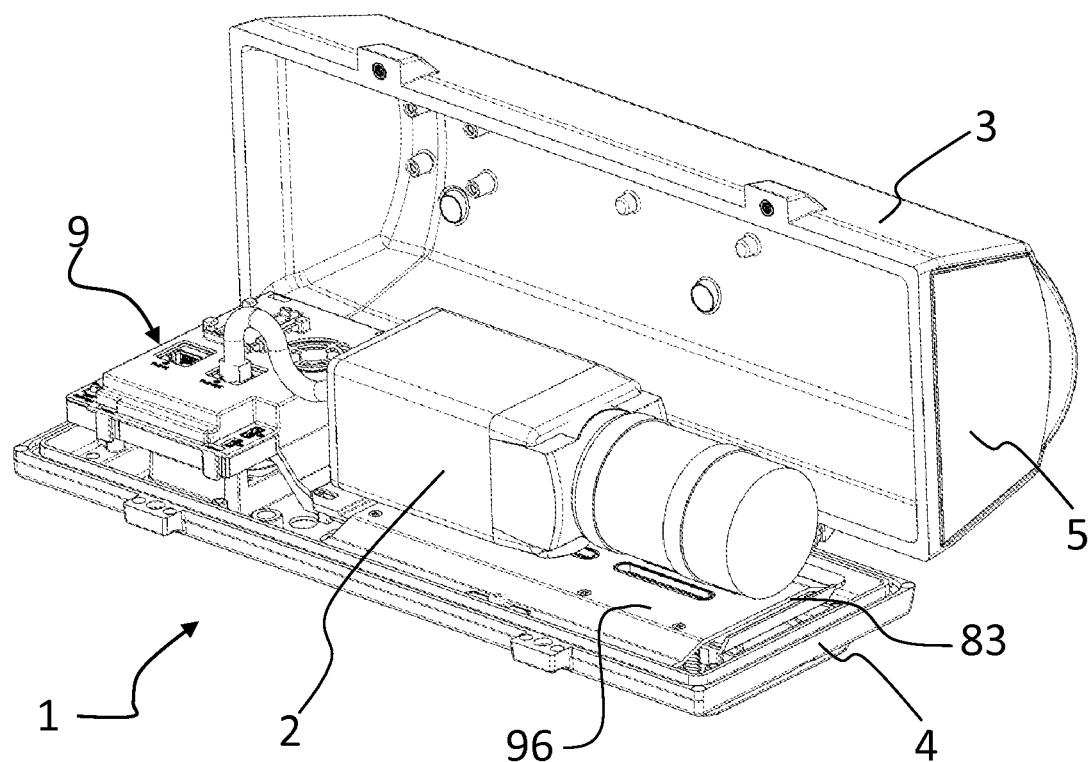
FIG. 1 is a perspective view of a case according to the invention in the opened condition, with a video camera housed therein.
Figure 2:
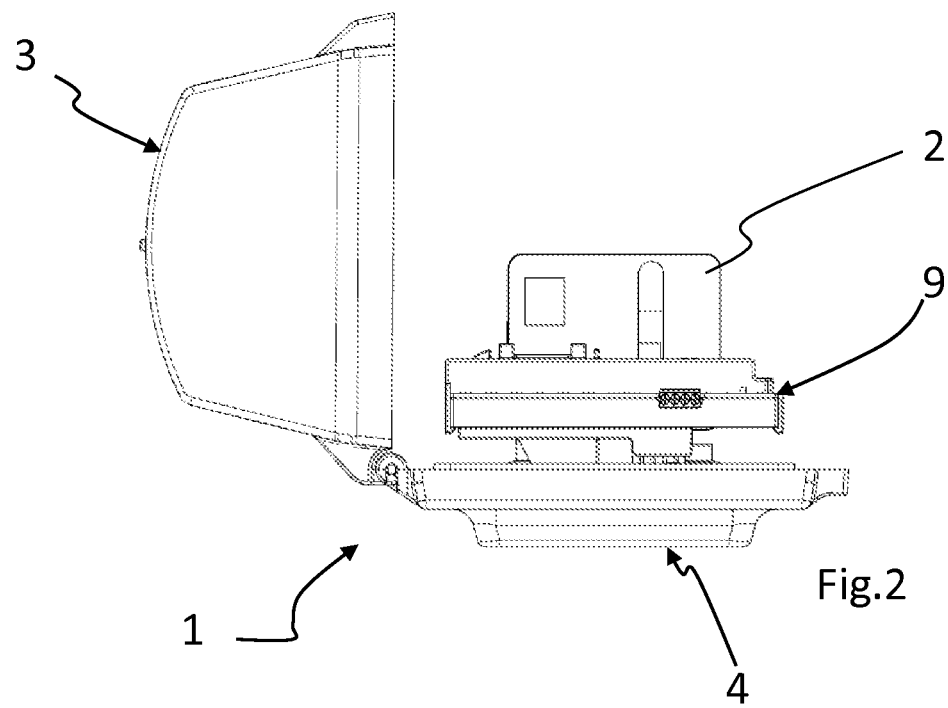
FIG. 2 is a front view of the previous figure.
Figure 3:
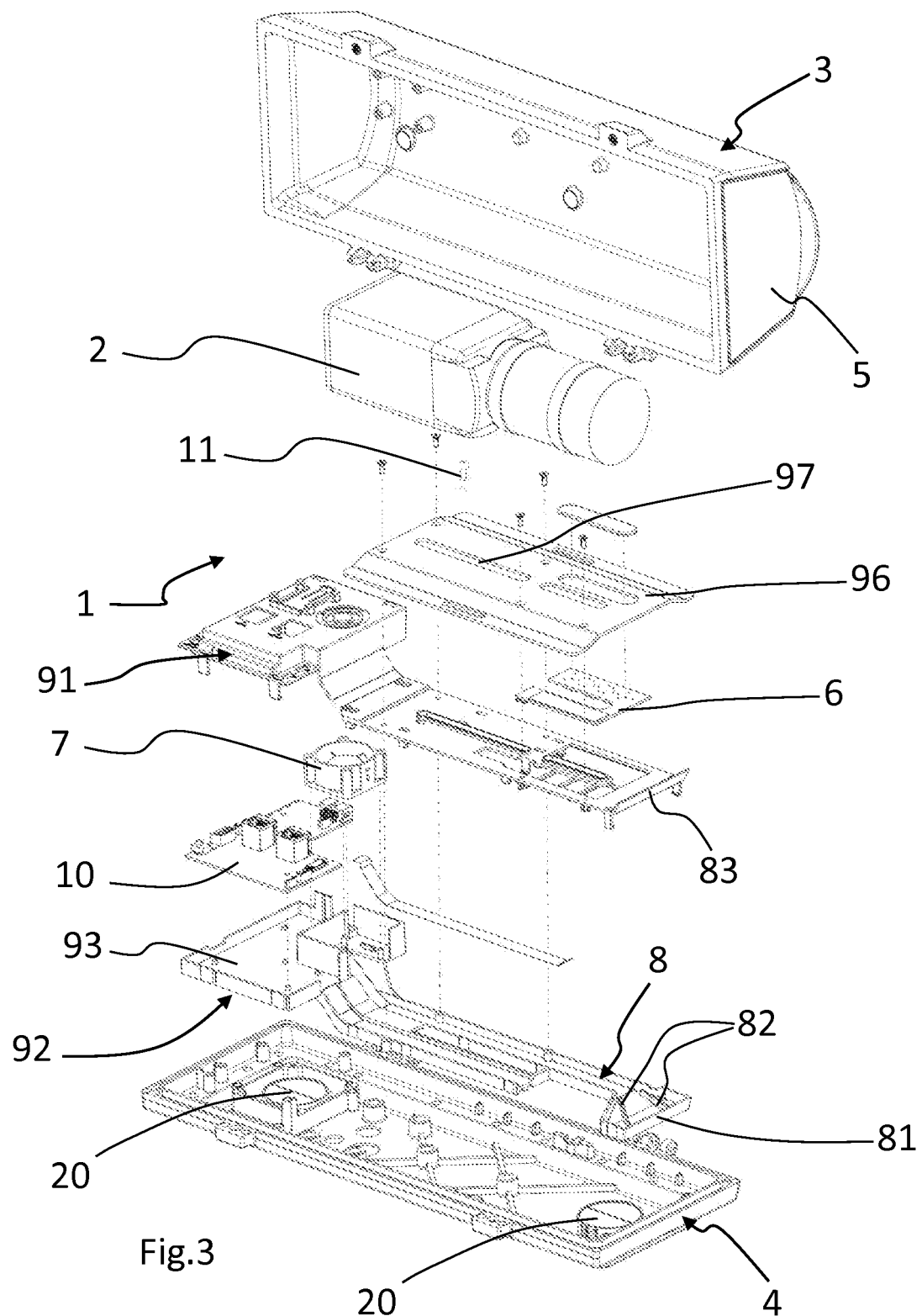
FIG. 3 is an exploded view of the case of the previous figures.

While the invention is susceptible of various modifications and alternative forms, some preferred embodiments are shown in the drawings and will be described below in detail. It should be understood, however, that there is no intention to limit the invention to the specific embodiment disclosed, but, on the contrary, the intention of the invention is to cover all modifications, alternative forms, and equivalents falling within the scope of the invention as defined in the claims.

The use of "for example", "etc", "or" indicates non-exclusive alternatives without limitation unless otherwise defined. The use of "including" means "including, but not limited to," unless otherwise defined.

With reference to the annexed figures, they show a case 1 for surveillance video cameras 2 according to the invention.

The case 1 comprises a first 3 and a second 4 half-shell connectable to each other to define a volume housing at least one videocamera 2.

In the example of FIG. 1, the two half-shells 3 and 4 are hinged to each other such to be easily connected or disconnected.

The two half-shells are preferably (but not necessarily) made of metal, for example aluminum or a preferred metal alloy and particularly at least one of them (in this example the upper half-shell 3) comprises a transparent panel 5 intended to be placed in front of the lens of the video camera such to allow it to inspect an environment to be monitored.

The case 1 further comprises air flow generating means 7, which, in the shown example, comprise an electric fan which takes air from one side and blows it to the opposite side.

The case 1 comprises also heating means 6 intended to raise the temperature of the air flow generated by the fan 7; in the example the heating means 6 comprise one or more heating elements arranged on a common support board (e.g. a PCB, "printed circuit board"), such to be put in a convective heat exchange condition with the air fed to the conveying duct 8 by the fan 7 and which is finally directed towards the transparent panel 5 in order to heat it and thus to prevent it from being misted up when outside of the case 1 there is a low temperature.

Advantageously the conveying duct 8 comprises at least one section or trunk which is characterized in that it is delimited by surrounding walls completely made of plastic material, such to isolate the air flow directed to the transparent panel and such to avoid its temperature to drop.

More in detail, the case 1 comprises a holding device 9 for the video camera 2 which is fixed to one of the two half-shells, in this example to the lower half-shell 4.

The holding device 9 defines the surrounding walls made of plastic material of the section of the conveying duct 8.

Figure 4:
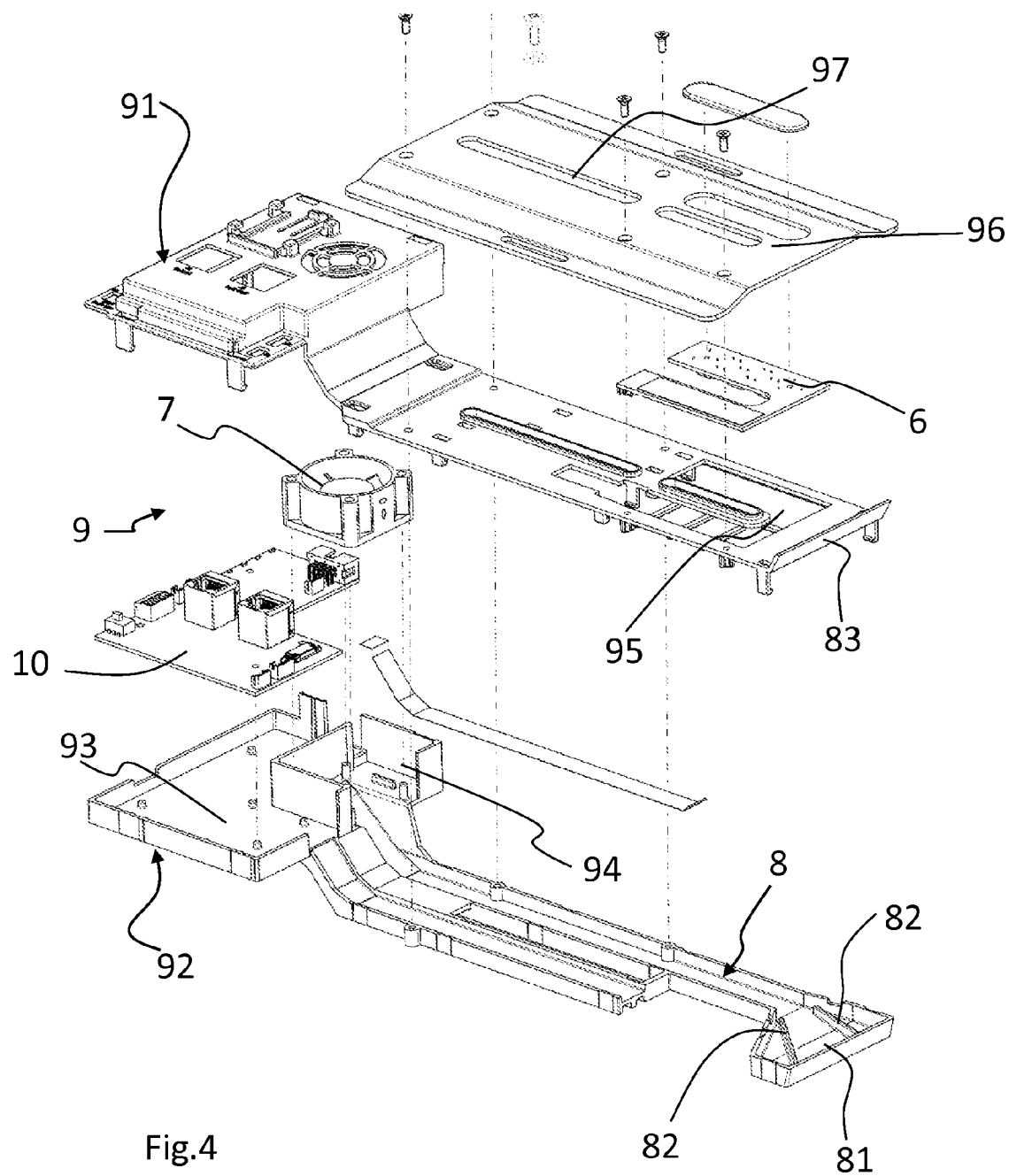
FIG. 4 is an exploded view of a detail of the case of the previous figures.

More in detail and with reference to FIG. 4, the holding device 9 comprises a first 91 and a second 92 body part connectable to each other in a box-like manner.

In substance the two parts 91 and 92 together, in the coupled condition, in this example define a first housing 93 for an electronic unit 10 controlling the video camera 2.

In the case the video camera 2 is of the type powered by the PoE system (mentioned above) the electronic unit is intended both to process the video data and to treat power, which is distributed by it to the different apparatuses (video camera, fans, heating elements etc.) inside the case 1.

Anyway this data treatment/power system is known per se and no further reference is made thereto.

The two parts 91 and 92 in the coupled condition, define also a second housing 94 for the air flow generating means 7, that is in this example for the fan.

Advantageously the housing 94 for the air flow generating means 7 is close to the first housing 93 for an electronic unit 10 and it is in fluid communication therewith, for example by suitable openings.

Thus the heat produced by the electronic unit 10 can be discharged such to convey it towards the transparent panel 5 by the air flow generated by the fan.

The section or trunk of the conveying duct 8 defined by the surrounding walls made of plastic material is formed by the coupling between the two parts 91 and 92 (in the coupled condition).

As shown in the annexed figures, the holding device 9 comprises also a fixing seat 95 for the heating means 6, that is for the board supporting the heating elements in this example.

Such seat is advantageously made on the first body part 91 near one of the surrounding walls of the conveying duct 8, such to allow the air flow passing in the duct 8 to be heated.

As regards the latter, it can be noted that it extends substantially between the housing 94 (where it has a first opening) and an enlarged opening 81 arranged close to the transparent panel 5, such to feed the warm air flow as closest as possible thereto, maximizing the demisting effect and reducing losses of heat.

It has to be noted incidentally that the enlarged opening 81 of the conveying duct 8 comprises diffusion flaps 82 arranged inside the duct 8 for distributing the air flow uniformly on the transparent panel 5.

For the same reason, the first body part 91 at the enlarged opening 81 comprises a diffusion flap 83 which is tilted with respect to the transparent panel 5.

According to an advantageous feature, which can be used in combination with or independently with those just described, the holding device 9 comprises a fixing plate 96 for the video camera 2.

Such plate 96 is advantageously provided with at least one slotted hole 97 for being coupled in an adjustable way with a positioning means 11 of the video camera 2; in the example shown the positioning means 11 is a simple screw with a washer that allows the position of the video camera 2 to be adjusted and fixed in the case 1 depending on the dimensions or on the type; it has to be considered that the same case 1 can house different types of video cameras, depending on needs. The plate 96 with the slot 97 actually constitute a slide upon which the video camera can slide in the installation phase.

Advantageously the fixing plate 96 comprises a metal body, preferably it is entirely made of metal material, for example aluminum or a special alloy, and it is placed in contact with or in the immediate vicinity to the heating means 6 for the air flow. This arrangement allows an efficient heat exchange (by contact or by conduction) to be provided between the heating means 6 and the plate 96. The heat generated by the heating means 6, arranged in the front part of the case, is thus transferred on the whole surface of the plate 96, it being made of metal, that is a good heat conductor. Since the video camera 2 is fixed on the plate, this choice allows the video camera to be efficiently heated.

Then the lower half-shell 4 has two openings with breakable baffles 20 which open when positioning the case 1 in its operating condition and which allow a certain air exchange with the outside.

The operation of the case 1 according to the invention, and the relevant advantages, are immediately clear from what described up to now: when the temperature outside the case is low the heating elements 6 are turned on and the fan 7 is operated; this latter takes air from the inner volume of the case and from the housing of the electronic unit 10, which therefore is advantageously cooled.

The heated air taken from the surroundings of the electronic unit 10 is conveyed into the duct 8 which avoids losses of heat by the fact that its walls are made of insulating material, such as for example plastic, a bad heat conductor.

Therefore the air flow comes in contact with the heating elements 6, arranged in a portion of the duct placed under the plate upon which the video camera is fixed and its temperature raises. Preferably it is raised up to a desired value, obtained by adjusting the power absorbed by the heating elements and by controlling the temperature by means of a sensor, e.g. a thermistor such as a PTC (Positive Temperature Coefficient).

The air flow heated in this manner therefore comes to the opening 81 from where, thanks to the flaps 82 and 83, it is uniformly directed on the transparent panel 5, for demisting it by moisture evaporation.

Therefore the air goes on in its path in the volume of the case, towards the rear thereof, and then it is again recovered by the fan 7 and the cycle is repeated. At the same time the temperature of the video camera 2 is kept at a suitable and preferred value by the fact that the plate 96 is heated due to the conduction with heating elements 6.

The person skilled in the art can appreciate how the assembly shown in FIG. 4 is a holding device 9 for a surveillance video camera 2 that can be used into different types of protection cases 1.

Such a device, comprises a body comprising linking means for supporting a video camera in different relative positions with respect to the body, air flow generating means 7, and at least one electric circuit for powering and/or controlling the air flow generating means.

The body of the device comprises a housing 94 for the air flow generating means and a housing for the electric circuit. The body comprises a first 91 and second 92 parts connectable to each other and such that, once coupled, define at least one section of a conveying duct 8 for an air flow. The duct is defined by surrounding walls made of insulating material, preferably plastic material, and extending between a first and a second end; the first end opens on the housing 94 for the air flow generating means 7, while the second end faces an end of the body opposite to the position of the housing 94 on the body itself.

Advantageously, the holding device 9 according to claim 9, further comprises heating means 6 and a seat 95 for fixing the heating means 6. Such fixing seat 95 is made on the first body part 91 at one of said surrounding walls of the conveying duct 8. The seat, particularly, is placed in a position near the second end, such that it heats the air near the outlet from the duct.

The holding device 9 preferably comprises a metal fixing plate 96 provided with a slotted hole 97 intended to receive a positioning means 11 of a video camera 2. The fixing plate is mounted at least partially above or in contact with the heating means 6, such that an air flow generated by the air flow generating means 7, flowing through the heating means comes in contact with the fixing plate.

The above description allows understanding how the case and the holding device inserted therein allow the above mentioned objects to be achieved.

Therefore the person skilled in the art can made many changes to the case and to its components described above while keeping the idea of positioning the heating means in the front of the case in contact with a duct made of insulating material transporting air from a fan towards the transparent panel of the case desired to be demisted.

The invention claimed is:

1. A case (1) for a surveillance video camera (2) comprising
a first (3) and a second (4) half-shell connectable to each other to define a housing volume for at least one video camera (2), wherein at least one of said first (3) and said second (4) half-shell comprises a transparent panel (5) placed in front of a lens of said surveillance video camera (2),
air flow generating means (7) and means (6) for heating said air flow
a duct (8) for conveying said air flow towards said transparent panel (5)
a holding device (9) for said video camera (2)
characterized in that
said holding device (9) defines surrounding walls made of a heat insulating plastic material, of at least one section of said conveying duct (8)
wherein said holding device (9) comprises a seat (95) for fixing said means (6) heating said air flow, said seat being made on a first body part (91) near one of the surrounding walls of said conveying duct (8).

2. The case (1) according to claim 1, wherein said holding device (9) comprises a first body part (91) and a second (92) body part connectable to each other which, in the connected condition, define together at least one among:
a first housing (93) for an electronic unit (10) for controlling said video camera (2)
a second housing (94) for said air flow generating means (7)
said section of said conveying duct (8) defined by surrounding walls made of plastic material.

3. The case (1) according to claim 2, wherein the conveying duct (8) has a first opening facing said second housing (94) for said air flow generating means (7) and a second opening (81) close to said transparent panel (5).

4. The case (1) according to claim 3, wherein said second opening (81) of said conveying duct (8) comprises two diffusion flaps (82) internal to said duct for distributing the air flow in a uniform way on said transparent panel (5).

5. The case (1) according to claim 3, wherein at said second opening (81) said first body part (91) comprises a diffusion flap (83) tilted with respect to the transparent panel (5).

6. The case (1) according to claim 1, wherein said holding device (9) comprises a fixing plate (96) for fixing said video camera (2) provided with at least a slotted hole (97) to be connected in an adjustable way with a positioning means (11) of said video camera (2).

7. The case (1) according to claim 6, wherein said fixing plate (96) is made of metal and it is placed in contact with said means (6) heating said air flow.

8. A holding device (9) for a video camera (2) for use in a protection case (1), comprising
   a body
   air flow generating means (7) for generating an air flow,
   at least one electronic unit for supplying and/or controlling the air flow generating means (7) for generating an air flow,
   wherein the body of the device comprises a second housing (94) for the air flow generating means (7) for generating an air flow and a first housing for the electronic unit, and wherein the body comprises a first body part (91) and a second body part (92) connectable to each other, wherein said first and second body parts are such that once connected they define at least one section of a conveying duct (8) for said air flow, said conveying duct (8) being defined by surrounding walls made of a heat insulating material, and extending between a first and a second end of said conveying duct (8), wherein said first end of said conveying duct (8) opens on the housing (94) for the air flow generating means (7) and wherein said second end of said conveying duct (8) faces an end of said body that is opposite to said first end of said conveying duct (8) where said housing (94) is positioned, wherein a second opening (81) of said conveying duct (8) comprises two diffusion flaps (82) internal to said conveying duct (8) for distributing the air flow in an uniform way on a transparent panel (5), and said first body part (91) comprises a diffusion flap (83) tilted with respect to the transparent panel (5).

9. The holding device (9) according to claim 8, further comprising heating means (6) and a seat (95) for fixing a heating means (6), wherein said fixing seat (95) is made on said first body part (91) at one of said surrounding walls of said conveying duct (8), and wherein said seat is placed in a position proximal to said second end.

10. The holding device (9) according to claim 9, comprising a metal fixing plate (96) provided with a slotted hole (97) adapted to receive a positioning means (11) of said video camera (2), said fixing plate being mounted at least partially above or in contact with said heating means (6), so that said air flow, comes in contact with the fixing plate (96).

* * * * *